United States Patent [19]
Prophet et al.

[11] Patent Number: 5,882,553
[45] Date of Patent: Mar. 16, 1999

[54] MULTI-COLOR LENS ASSEMBLY INJECTION MOLDING PROCESS AND APPARATUS

[75] Inventors: Philip Alan Prophet, Alexandria; John Eric Hall, Anderson, both of Ind.

[73] Assignee: Guide Corporation, Anderson, Ind.

[21] Appl. No.: 871,169

[22] Filed: Jun. 9, 1997

[51] Int. Cl.[6] .................................................. B29D 11/00
[52] U.S. Cl. .......................... 264/1.7; 264/1.9; 264/2.1; 264/247; 264/297.3; 264/328.8; 425/129.1; 425/576; 425/588; 425/808
[58] Field of Search .................................... 264/17.1, 1.9, 264/2.1, 245, 246, 247, 255, 297.3, 328.8, 328.11, 310; 425/120, 125, 129.1, 575, 576, 588, 808

[56] References Cited

U.S. PATENT DOCUMENTS

| | | | |
|---|---|---|---|
| 3,807,920 | 4/1974 | Aoki | 264/245 |
| 4,711,621 | 12/1987 | Schomblond | 425/120 |
| 5,275,764 | 1/1994 | Hettinga | 264/1.7 |
| 5,320,511 | 6/1994 | Woerner | 425/130 |
| 5,413,743 | 5/1995 | Prophet | 425/808 |
| 5,494,615 | 2/1996 | Wang Lee | 425/129.1 |
| 5,753,151 | 5/1998 | McBride | 264/247 |
| 5,756,013 | 5/1998 | Yanagihara et al. | 264/297.3 |

Primary Examiner—Mathieu D. Vargot
Attorney, Agent, or Firm—Ice Miller Donadio & Ryan; Jay G. Taylor

[57] ABSTRACT

A multi-colored lens assembly is produced in a multi-station injection molding apparatus having non-indexing ejector halves and indexing cover halves. Material is shot on an unexposed illumination side of the lens assembly from valve gated nozzle drops contained in the non-indexing ejector halves thereby producing a viewing side of the lens assembly free of surface blemishes and surface stress defects. Lens assemblies are retained in the indexing cover halves by retention mechanisms provided to overlap peripherally extreme features of the lens assemblies. Lens assemblies are affirmatively released from the non-indexing ejector halves by ejection pins or blades simultaneously with parting of the mold halves.

11 Claims, 6 Drawing Sheets

MULTI-COLOR LENS ASSEMBLY INJECTION MOLDING PROCESS AND APPARATUS

TECHNICAL FIELD

The present invention is related to plastic injection molding.

BACKGROUND OF THE INVENTION

Plastic injection molding is a commonly practiced general technique for mass production of automotive lens assemblies. Processes and machinery may be adapted for production of multi-colored lens assemblies such as may be found on rear taillamp assemblies which incorporate rear marker, braking, turn signal, hazard and reverse indicators. Such multi-colored lens assemblies are generally well accepted for their final assembly advantages, styling flexibility, and aesthetically pleasing appearance.

Multi-color lens assemblies generally require sophisticated injection molding apparatus comprising multiple injection stations. That is to say, multi-colored lens assemblies are generally injection molded at sequentially progressive injection stations wherein each such station is dedicated to molding certain colors and/or features of the lens assembly.

Generally, multiple injection station molding apparatus employ automated transfer of parts from one injection station to the next sequentially progressive injection station. Certain mold injection arrangements are generally more desirable than others, particularly when transferring molded parts from one station to another in a multi-station injection molding apparatus. For example, central valve gating parts at a major surface is generally preferred to edge gating parts since additional trimming operations and cavity fill limitations are associated with edge gating operations. Additionally, the nozzle drops in valve gate operation generally provide for simpler material distribution to the cavities to be filled. However, lens assemblies are generally shaped with a smooth convex outer or viewing side exposed to the environment and a concave inner or illumination source side including structural features. Where valve gating is practiced on lens assemblies, the part geometries have necessitated valve gating on the viewing side from nozzle drops in non-indexing cover halves with material draws into the opposing indexing ejector half. The material draws advantageously provide retention of the molded part to the indexing ejector half allowing the indexing ejector half to move to the next injection station with the part intact. Valve gating lens assemblies on the viewing side, however, tends to leave injection point witness marks which are aesthetically unacceptable particularly when located in a central location of a transparent portion of the lens assembly. Additionally, particularly with respect to the preferred plastic material, polycarbonate, surface stress localized about the injection site may preclude ultraviolet protective coating application due to extremely noticeable surface blemishes which appear in the areas of the surface stress when coated. This is a disadvantage since unacceptable discoloration and deterioration of polycarbonate is known to occur when exposed to ultraviolet light.

SUMMARY OF THE INVENTION

The present invention advantageously valve gates multi-colored lens assemblies on the concave illumination side of the lens assembly thus placing any surface defects including injection point witness marks and surface stresses on the unexposed surface of the lens assembly. Thus, ultraviolet protective coatings may be successfully applied to the viewing side of the lens assembly without resulting in unacceptable surface blemishes. The present invention advantageously carries molded parts from station to station in a multi-station apparatus without any material draw in the indexing half of the mold.

These and other advantages of the present invention are provided for by and in a multi-station injection molding apparatus having an indexing cover half and non-indexing ejector halves. The non-indexing ejector halves provide ejection apparatus, and hot melt manifold and nozzle drop access for valve gating. The indexing cover halves are adapted for retention of the molded lens assembly without the necessity of material draw into the indexing cover half. In accordance with one preferred embodiment of the invention, positioning of retention apparatus to retain and release molded parts is provided for by positioning apparatus associated with the indexing cover half. In accordance with an alternative embodiment of the invention, positioning of retention apparatus to retain and release molded parts is provided for by positioning apparatus associated with the non-indexing ejector half.

More specifically, a multi-station mold apparatus has, for example, three injection molding stations. At the initial station a portion of the lens assembly is valve gated. This portion has peripherally extreme features which with the retention apparatus to trap the molded part to the indexing cover half. That is to say, edges of the lens assembly are overlapped by retention apparatus in an engaged position. Each injection station has an associated non-indexing ejector half which has associated therewith a respective ejection apparatus. Ejector pins and/or blades are stroked in unison with the parting of the mold halves so that the molded part is released from the ejector half and remains with the indexing cover half. Various structural features which generally take the form of material draw may therefore be provided for in the non-indexing ejector half and successfully ejected therefrom.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
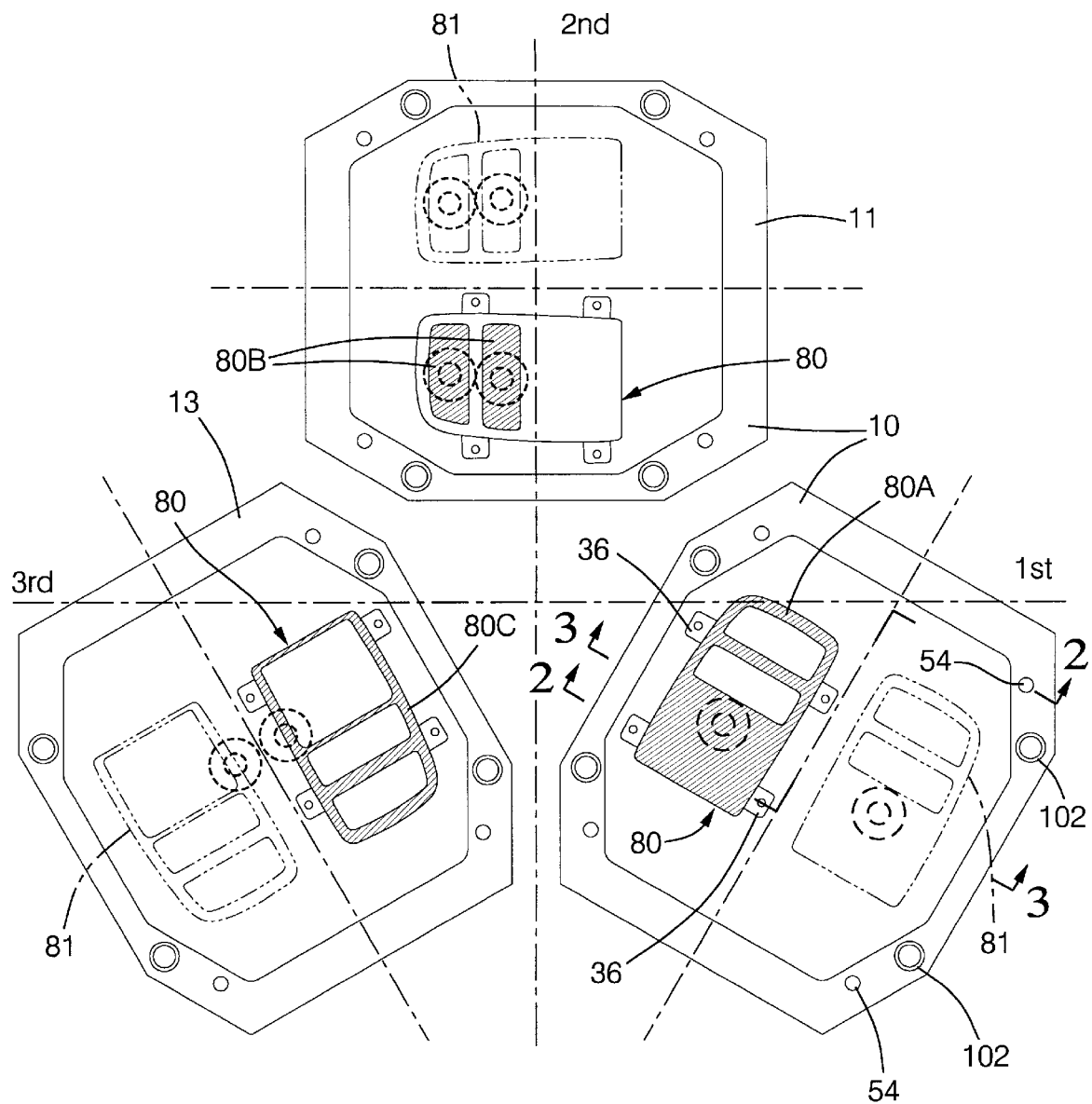
FIG. 1 is a schematic plan view of non-indexing halves in a multi-station injection molding apparatus in accordance with the present invention.
Figure 2:
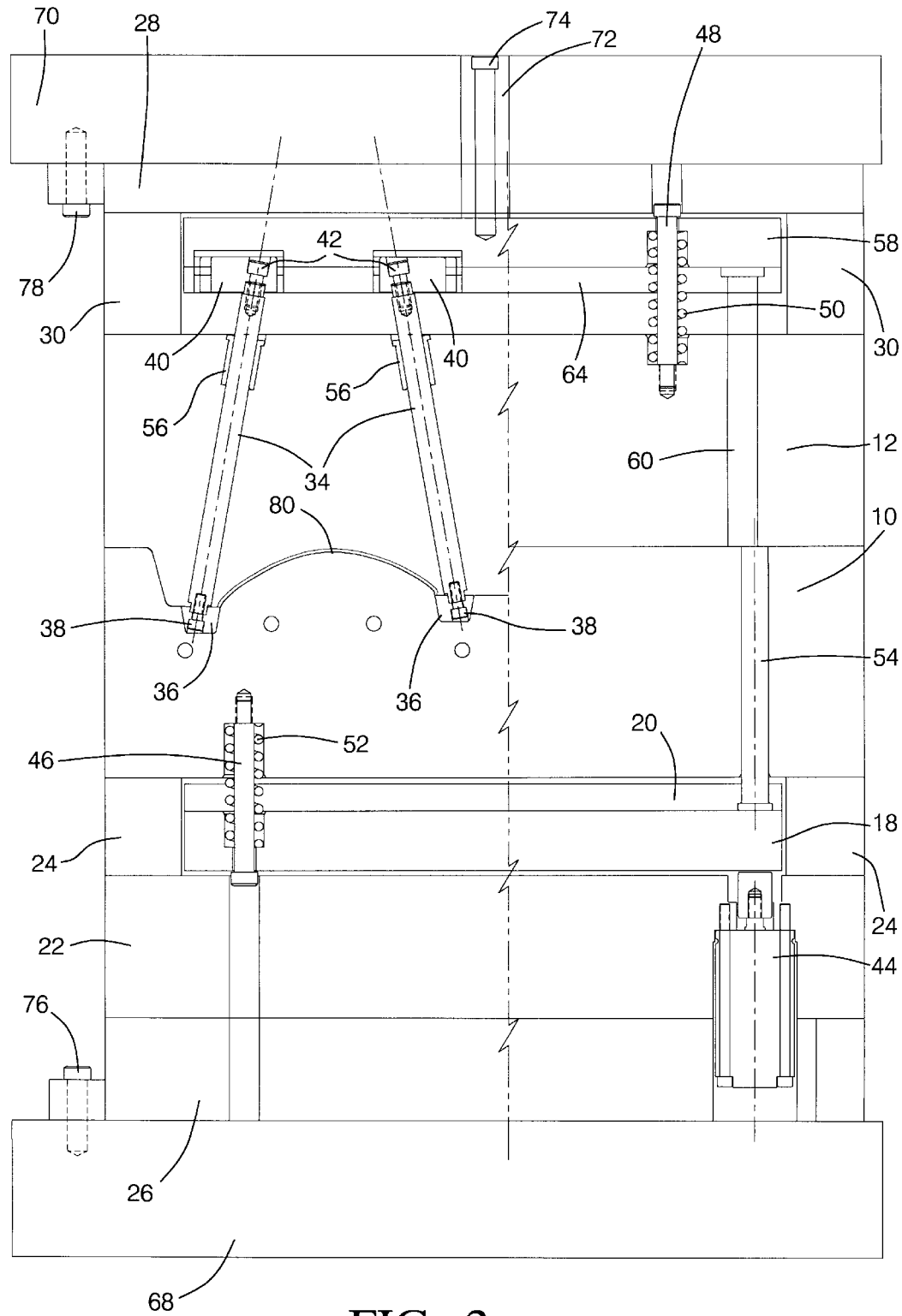
FIG. 2 is a schematic stepped-sectional view through a multi-station injection molding apparatus taken along line 2—2 of FIG. 1 in accordance with a preferred embodiment of the present invention.
Figure 3:
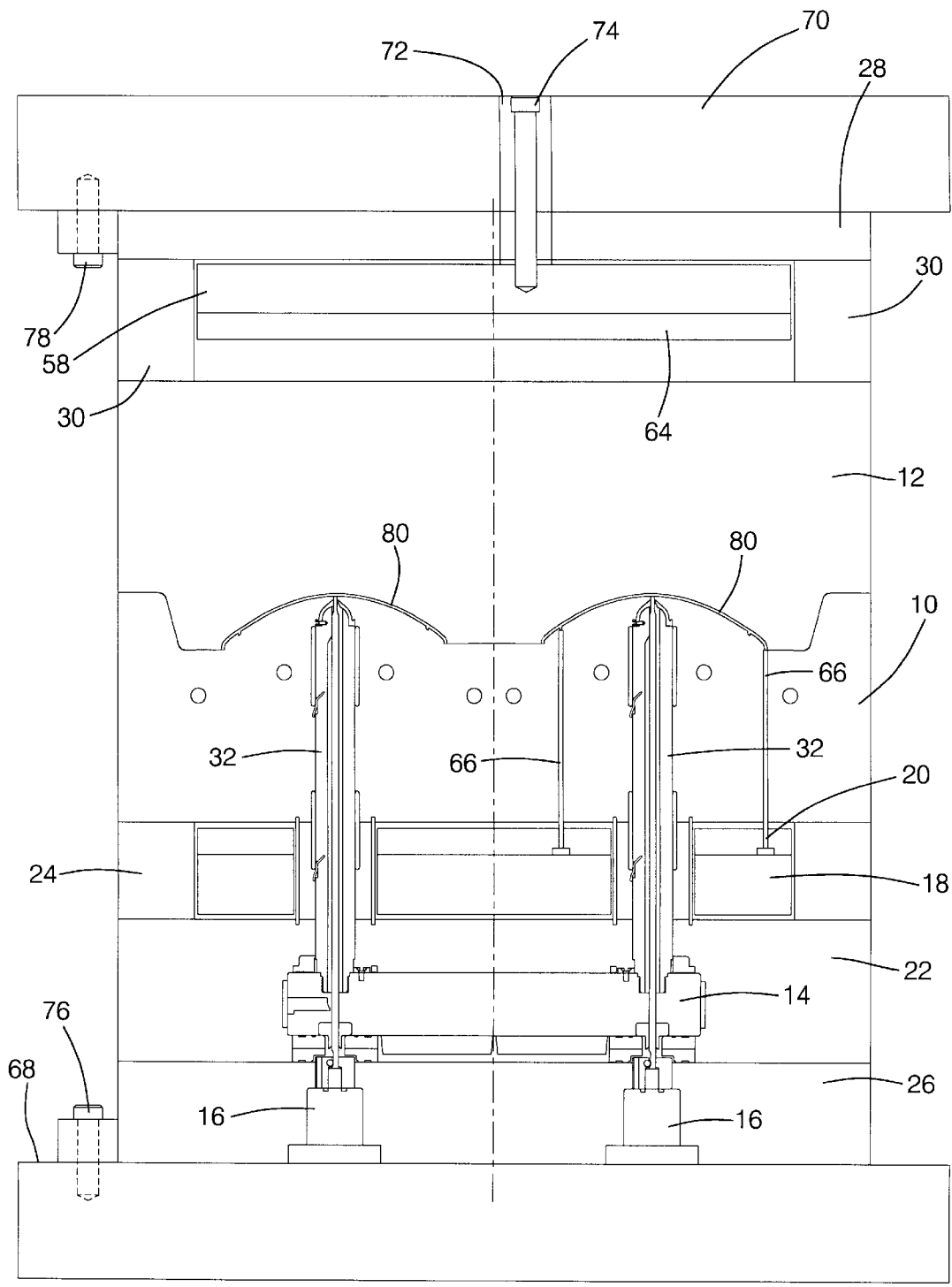
FIG. 3 is a schematic sectional view through a multi-station injection molding apparatus taken along line 3—3 of FIG. 1 in accordance with a preferred embodiment of the present invention.

Referring first to the various FIGS. 1–3, an exemplary injection molding apparatus for manufacturing a multi-color automotive lens assembly is illustrated. In the embodiment illustrated, a three station molding apparatus is assumed though the principles of the present invention as applied to the apparatus and process aspects are equally applicable to more or fewer molding stations. Among the various views, identical reference numerals which appear in more than one figure refer to like features. Those skilled in the art will recognize FIG. 1 to be a schematic plan view of stationary lower halves 10, 11 and 13 of a three station injection molding apparatus. Included also in the view of FIG. 1 are the various general portions 80A, 80B, and 80C, illustrated in cross-hatching, of a multi-color lens assembly 80 shot at respective molding stations. The molding stations of FIG. 1 are labeled 1st, 2nd and 3rd to correspond to the sequential progression of the upper half of the apparatus (not illustrated in FIG. 1). Preferably, a corresponding number of indexing upper halves are employed in the manufacturing process and apparatus such that any production run will utilize all of the stations in the simultaneous injection of respective station specific portions of the lens assembly. Leader pin guides 102 associated with each lower half provide conventional guide bushings for corresponding guide pins (not shown) located on the upper halves.

In a preferred practice, a pair of lens assemblies such as a left and right side vehicle components are produced in pairs as shown by the lens assembly 80 (solid outline) and lens assembly 81 (broken line outline) at each illustrated station. One skilled in the art will also recognize the circular broken line outlines as the respective station nozzle drop locations generally illustrating preferred locations for surface valve gating the molding material at the various stations.

The schematic stepped-sectional view of FIG. 2 corresponds to the stepped line 2—2 through the multi-station injection molding apparatus of FIG. 1. The figure includes both halves of the molding apparatus in the view as will be described in further detail. Similarly, the schematic sectional view of FIG. 3 corresponds to the line 3—3 through the multi-station injection molding apparatus of FIG. 1 and includes both halves of the exemplary molding apparatus as later described.

Non-indexing machine platen 68 provides a carrier for non-indexing lower mold apparatus including non-indexing ejector half 10, plastic injection apparatus, and other station specific actuation apparatus. The plastic injection apparatus generally includes nozzle drops 32, hot runner manifold 14 and valve gate cylinders 16 for transporting and injecting the molding material to the station specific mold cavities established by the upper and lower halves. The hot runner manifold is located and secured in conventional fashion within a cavity defined by manifold spacer plate 22 and ejector clamping plate 26. Ejector clamping plate 26 is fixably secured to the non-indexing machine platen 68 by a plurality of bolts 76. Additionally, a conventional hydraulic machine ram (not shown) is operatively coupled across the stationary and indexing machine platens and bi-directionally actuatable to close and clamp the mold halves or part and open the mold halves.

Ejector rails 24 separate manifold spacer plate 22 and non-indexing ejector half 10. Within the provided space, ejector plate 18 is slidably secured to the non-indexing ejector half 10 by way of guide bolts 46 engaged to the non-indexing ejector half 10. The ejector plate 18 is biased away from the non-indexing ejector half by return springs 52 surrounding each guide bolt 46 and engaged at opposite ends with the non-indexing ejector half 10 and the ejector plate 18. Each of a plurality of return pins 54 is slidably mounted through the non-indexing ejector half 10 and bears against the ejector plate 18 at a proximal end. The return pins 54 are trapped against the ejector plate 18 by ejector retainer plate 20 secured to the ejector plate 18. The return pins 54 are axially offset from a corresponding plurality of return pins 60 similarly slidably mounted through the indexing cover half 12. Therefore, a portion of the distal end of each return pin 54 bears against a portion of the distal end of a corresponding return pin 60 in the indexing cover half 12, and the remaining portion of the distal end of each return pin 54 bears against a portion of the parting surface of the indexing cover half 12 adjacent to the corresponding return pin 60. In addition to the return pins 54 described, one or more ejector pins 66 are similarly slidably mounted through the non-indexing ejector half 10 and bear against the ejector plate 18 at a proximal end. The ejector pins 66 are trapped against the ejector plate 18 by ejector retainer plate 20 secured to the ejector plate 18. Furthermore, the distal ends of ejector pins 66 bear against the multi-color lens assembly 80. As used herein, the term ejector pin refers to any of a variety of ejector pins or equivalent ejection apparatus such as ejector blades. The ejector plate 18 is engaged with a plurality of ejector plate actuator cylinders 44 for selective application of force opposite to that of the bias force of the return springs 52, whereby displacement of the ejector plate linearly strokes the return pins 54 and ejector pins 66.

Indexing machine platen 70 provides a carrier for indexing upper mold apparatus including indexing cover half 12 and cover half actuation apparatus. Cover clamping plate 28 is fixably secured to the indexing machine platen 70 by a plurality of bolts 78. The indexing machine platen 70 is adapted in conventional fashion to rotate the various upper mold apparatus from current injection stations to next injection stations in the proper relative sequence.

Cover rails 30 separate cover clamping plate 28 and indexing cover half 12. Within the provided space, cover lifter plate 58 is slidably secured to the indexing cover half 12 by way of guide bolts 48 engaged to the indexing cover half 12. The cover lifter plate 58 is biased away from the indexing cover half 12 by return springs 50 surrounding each guide bolt 48 and engaged at opposite ends with the indexing ejector half 12 and the cover lifter plate 58. Each of a plurality of return pins 60 is slidably mounted through the indexing cover half 12 and bears against the cover lifter plate 58 at a proximal end. The return pins 60 are trapped against the cover lifter plate 58 by cover retainer plate 64 secured to the cover lifter plate 58. The return pins 60 are axially offset from a corresponding plurality of return pins 54 similarly slidably mounted through the non-indexing ejector half 10 as previously described. Therefore, a portion of the distal end of each return pin 60 bears against a portion of the distal end of a corresponding return pin 54 in the non-indexing ejector half 10, and the remaining portion of the distal end of each return pin 60 bears against a portion of the parting surface of the non-indexing ejector half 10 adjacent to the corresponding return pin 54. The cover lifter plate 58 is engaged with a knock-out extension 72 by bolt 74. The knock-out extension is accessible through the top of the indexing machine platen 70 for selective application of force opposite to that of the bias force of the return springs 50, whereby displacement of the cover lifter plate 58 simultaneously strokes the return pins 60.

Upper mold apparatus further includes a plurality of edge retention heads 36 generally distributed around the outer periphery of the lens assembly as illustrated with clarity in the schematic plan view of FIG. 1. The edge retention heads 36 overlap peripherally extreme features of the lens assembly when in an engaged position as shown most clearly in FIG. 2. In the preferred embodiment, a corresponding plurality of lifter shafts 34 are fastened at one end thereof, such as by bolts 38, to the edge retention heads 36 and pass through the indexing cover half. Preferably, each lifter shaft 34 is angled inboard of the outer periphery of the lens assembly such that stroking of each lifter shaft translates the respective edge retention head 36 down from, and outboard of, the corresponding peripherally extreme feature of the lens assembly 80. The opposite end of each lifter shaft 34 is fastened, such as by bolts 42, to a respective shoe 40 which is slidably retained to cover retainer plate 64 and cover lifter plate 58 by conventional 'T' slot slide configuration or equivalent. The slidable engagement of each shoe 40 is required to allow for the displacements, substantially normal to the cover lifter plate 58 displacement, of each shoe 40 during cover lifter plate 58 actuation downward, and to allow for the opposite displacements of each shoe 40 during cover lifter plate 58 recovery or retraction upward. The retained engagement feature of each shoe 40 is required to cause the respective lifter shaft 34 and edge retention head 36 to follow the upward recovery or retraction of the cover lifter plate 58. It is preferred to provide a wear bushing 56 in the cover half at least at the opening closest to the cover lifter plate as shown in the figure.

All indexing upper mold apparatus are commonly joined at the respective indexing machine platens in a carousel arrangement adapted for conventional rotative sequencing of the upper mold apparatus through the various molding stations. The indexing or sequencing of the upper mold apparatus occurs when the mold is fully open. An open mold is characterized by the mold machine ram being in a retracted position and hence the stationary and indexing machine platens 68 and 70, respectively, being fully opened. Furthermore, an open mold is generally characterized by recovery or retraction of the ejector plate 18 and cover lifter plate 58 to the respective return spring biased positions away from respective mold halves. As such, it can be appreciated that the lifter shafts 34 in the upper mold apparatus are in the engaged position to retain the lens assembly 80 to the cover half for transport therewith to the next sequential station.

An important aspect of the present invention is embodied in the parting of the non-indexing ejector half 10 from the indexing cover half 12. The process of parting the mold halves is initiated after the molding material is shot at each station by relaxing the mold machine ram closing pressure. Contemporaneous with or subsequent to the mold machine ram closing pressure release, ejector plate actuator cylinder 44 pressures are applied to the ejector plate 18. Mold machine ram opening pressure is applied to the machine ram and, as the mold parts, the ejector plate 18 strokes the return pins 54 and ejector pins 66 in unison. As the return pins 54 bear on both the cover half and the respective return pins 60 associated with the upper mold apparatus, the stroking of the return pins 54 affirmatively causes the cover lifter plate 58 to follow the parting motion. The simultaneous stroking of the ejector pins provides release force to strategic portions of the lens assembly, particularly in the areas of deep material draws. The parting of the cover and ejector halves is substantially accomplished with minimal ejector plate 18 stroking, for example approximately 2.0 to 12.0 mm.

Figure 5:
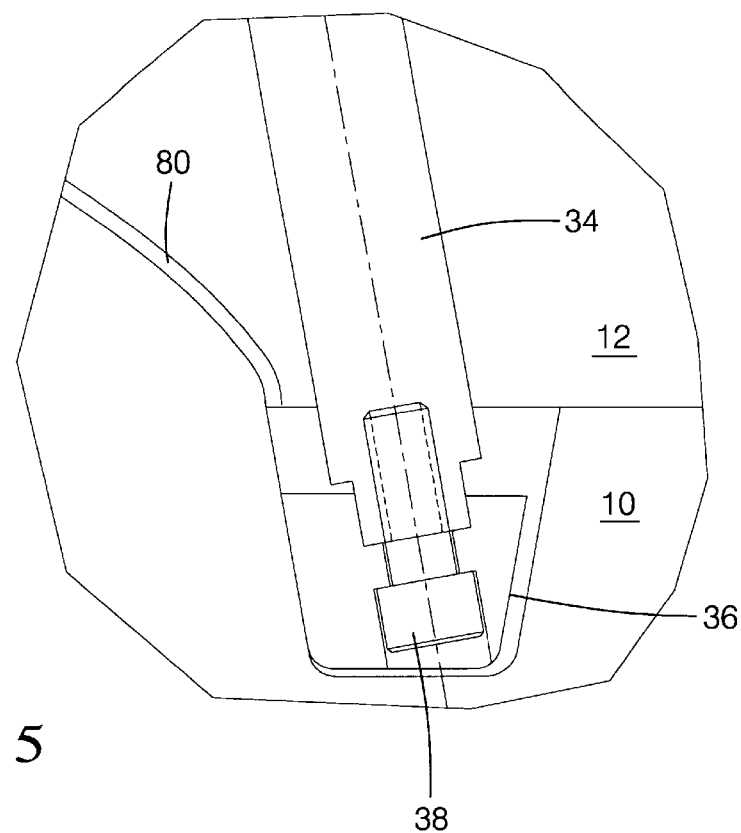
FIG. 5 shows in detail a preferred lens assembly to indexing half retention mechanism in accordance with the present invention.

After the cover and ejector halves have parted and the ejector plate 18 has fully stroked, the mold continues to open. During the continued mold opening, the cover lifter plate 58 remains biased by return springs 50 to maintain the edge retention heads 36 in the engaged position. Once the mold is fully opened, the final, or third station in the present embodiment, cycles a machine knock-out to stroke the cover lifter plate 58 by way of the knock-out extension 72. The stroking of the cover lifter plate 58 positions edge retention heads 36 into a disengaged position to liberate the lens assembly 80. A detailed view of a disengaged edge retention head 36 is illustrated in FIG. 5. As can be seen from the detail, the disengaged position of the edge retention head 36 is down and outboard of the peripherally extreme feature of the lens assembly 80 to allow unobstructed extraction of the finished part. The finished lens assembly 80 parts itself under the force of gravity from the cover half. The part may be captured manually or, preferably, by conventional robotic mechanism for transportation to subsequent manufacturing processes including protective coating applications, inspections, and packaging.

Another important aspect of the present invention is related to the sequence of molded structures. In order that the upper mold apparatus be enabled to transport the lens assembly 80 from one station to the next beginning with the first mold shot at the first station, the first mold station is the station at which the peripherally extreme features overlapped by the edge retention heads 36 must be shot. Therefore, in the exemplary three station multi-color lens assembly molding apparatus and process as best illustrated in FIG. 1, the first station molds a first transparent color, shot from the illumination side of the lens assembly, providing peripherally extreme features of the lens assembly sufficient to provide adequate retention of the part in conjunction with appropriately located edge retention heads 36. The schematic representation of the portion 80A of the lens assembly 80 shot at the first station is seen to encompass the entire outer periphery of the lens assembly in the present embodiment and hence provides the preferred situation wherein the edge retention heads 36 may be distributed substantially symmetrically about the lens assembly. The second station molds second and third transparent colors 80B, also shot from the illumination side of the lens assembly, abutting the first transparent color molded at the first station. Generally, immediate adjacency is required to physically interconnect the various portions of the lens assembly. The third station molds an opaque frame 80C, shot from the illumination side of the lens assembly, to overlay on the back side of the previously shot transparent portions 80A and 80B to provide desires structural and optical delimiting features of the lens assembly. Each of the station shots is performed substantially simultaneously in the embodiment described having a number of cover halves corresponding to the number of elector halves.

Figure 4:
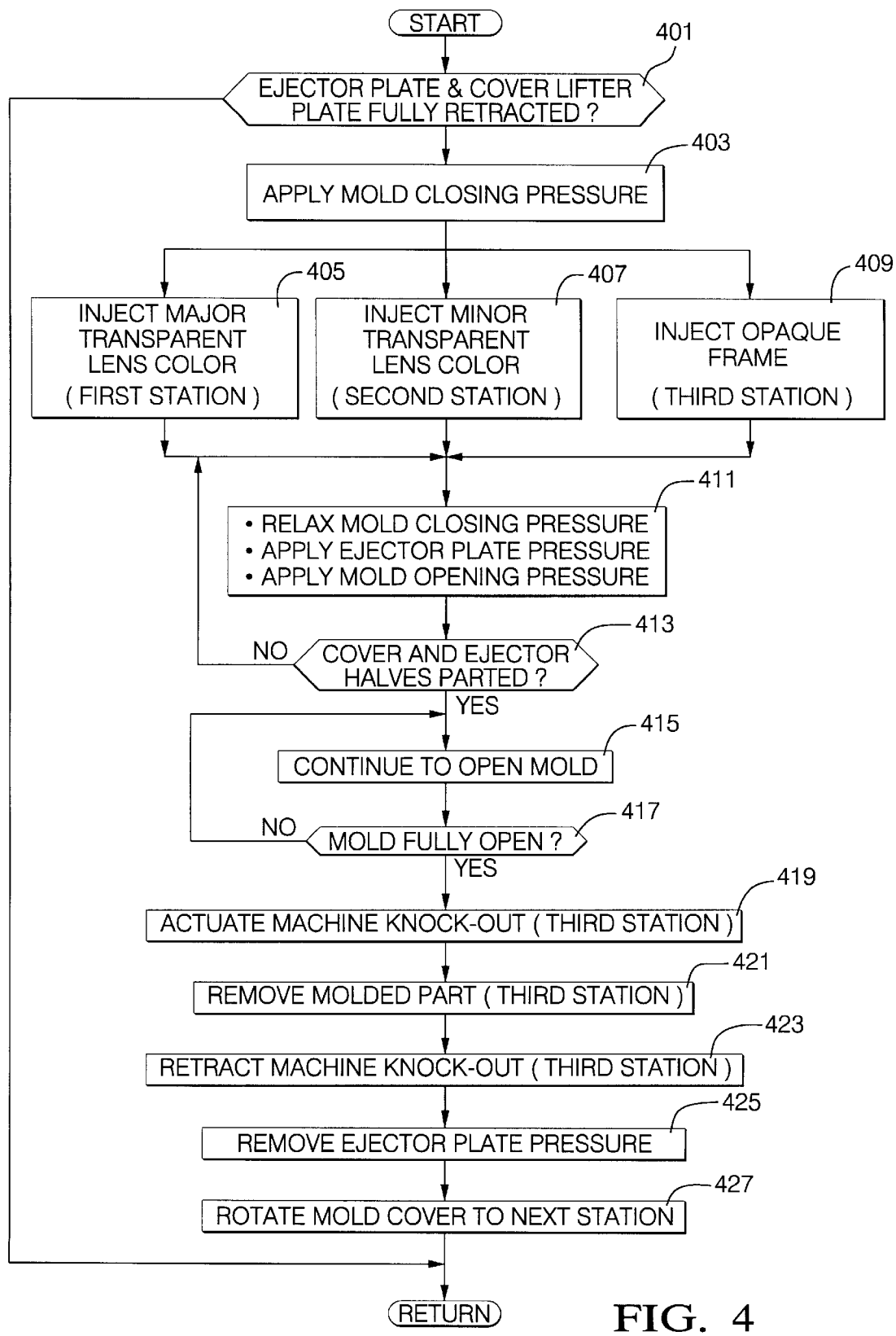
FIG. 4 represents a process flow for producing a multi-colored lens assembly in accordance with the present invention.

A process flow diagram is illustrated in FIG. 4 graphically depicting the preferred set of general processing steps described above. Open and closed states of the mold apparatus as well as strokes and retractions of various apparatus in the mold may be indicated by conventional microswitches or other position transducers and techniques conventionally practiced in the art.

Figure 6A:
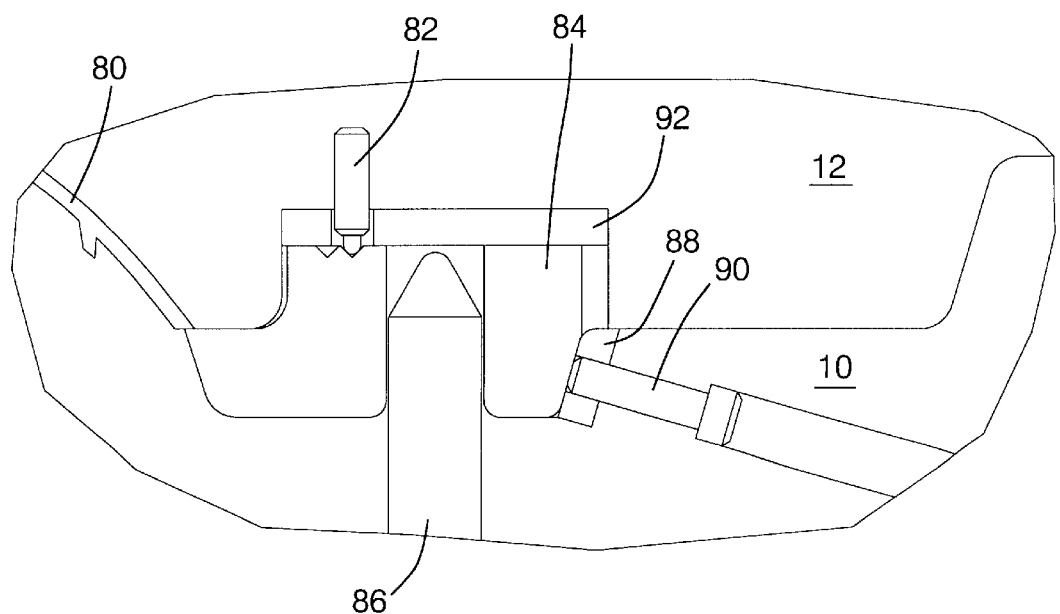
FIGS. 6A–6C show in detail an alternative lens assembly to indexing half retention mechanism in accordance with the present invention.
Figure 6B:
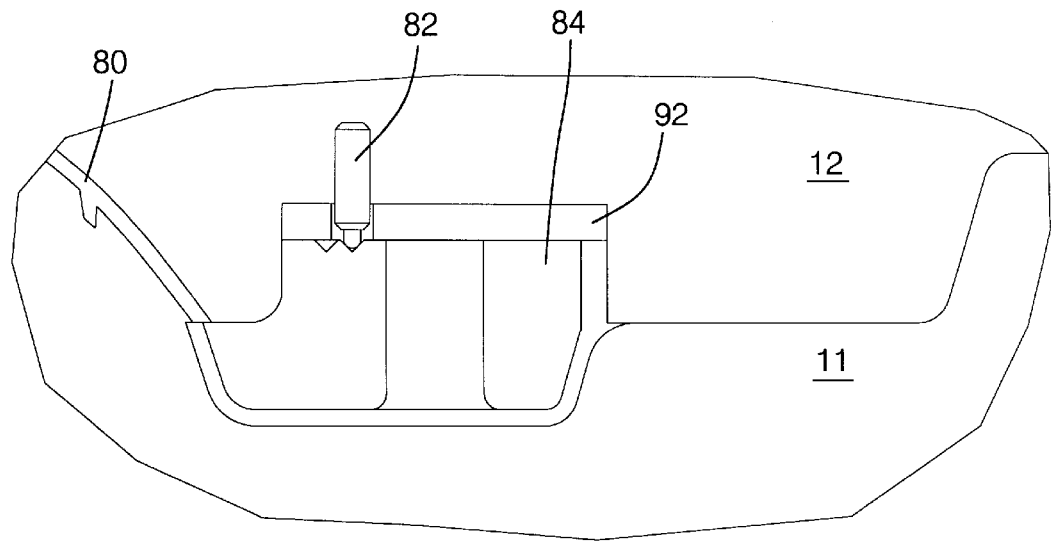
Figure 6C:
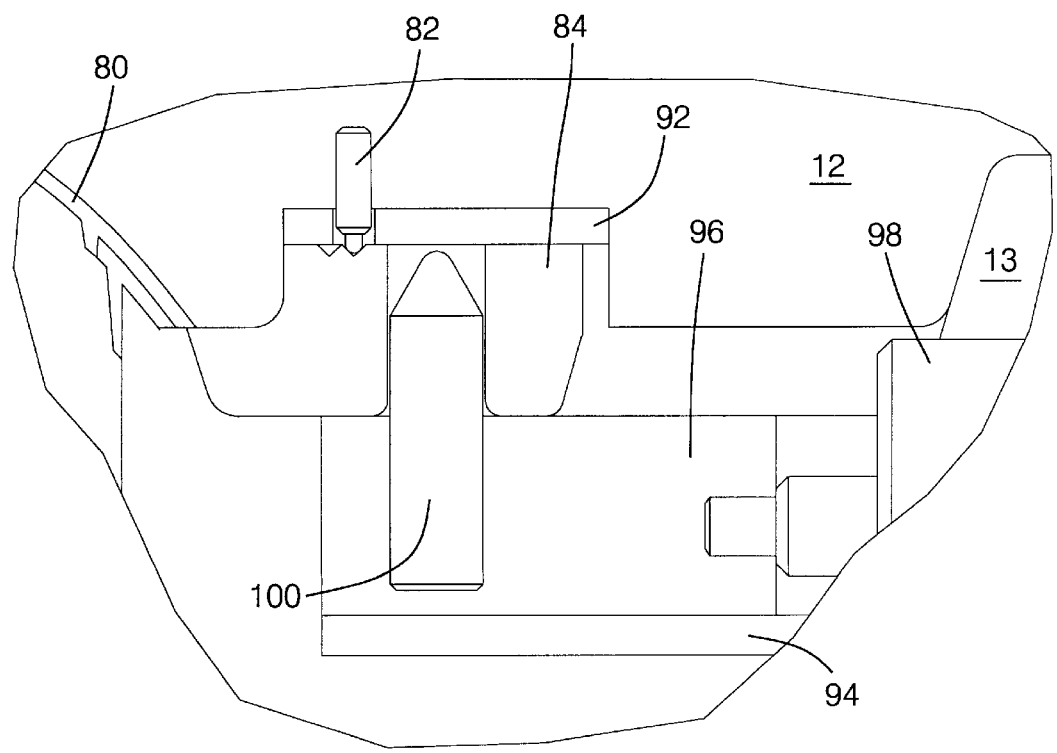

FIGS. 6A through 6C are offered to illustrate the first through third stations in accordance with an alternate embodiment primarily respecting the mechanization of the edge retention heads and positioning apparatus therefor. The edge lifter heads in the various FIGS. 6A–6C are fashioned as slides 84 in the indexing cover halves slidably retained by way of conventional "T" slot configurations and having conventional slide wear plates 92.

In FIG. 6A, representing the first station, closure of the cover half 12 to the ejector half 10 results in mating of the respective slides 84 with corresponding cam pins 86 secured to the ejector half. The cam pins effectively locate the slides into the desired position prior to mold closure. Upon full closure of the mold, lock block wear plate 88 establishes the net molding position of the slide 84 and provides the main bearing surface for the slide 84 during the high pressure molding process. Lock block wear plate 88 is secured such as by bolt 90 which also allows for necessary replacement of worn lock block wear plates 88. When the mold opens, vlier pin 82 through spring loaded action retains the slide in the engaged position for lens assembly 80 retention to the cover half 12.

In FIG. 6B, representing the second station, closure of the cover half 12 to the ejector half 10 occurs without any loading of the slide as evidenced by the clearance provided all around the slide 84 at the ejector half 10. This provision is assuming no molding material injection in contact with the slide 84 which would require a lock block wear plate or equivalent loading mechanization of the slide 84. In the present embodiment, vlier pin 82 provides adequate retention for the slide at the second station.

In FIG. 6C, representing the third and final station, closure of the cover half 12 to the ejector half 10 results in mating of the respective slides 84 with corresponding dowels 100. Each dowel 100 is integrated with an ejector half slide 96 actuatable in bi-directional fashion to establish the net molding position of the slide 84 during the mold material injection and to establish the slide 84 in the disengaged position subsequent to the mold injection process. The bi-directional actuation of the injector half slide 96 may be accomplished by way of a conventional cylinder 98 (shown schematically) secured to the ejector half 10. A conventional wear plate 94 is preferably employed to benefit the ejector half slide 96.

In the alternate embodiment described with respect to FIGS. 6A through 6C, the slides 84 are actuated into the disengaged position prior to the mold parting or opening only at the last or third station. Consequently, the lens assembly is retained in the cover half 12 at all stations with the exception of the last station during the parting and opening of the mold. At the last station, the ejection apparatus may be mechanized to eject the completed lens assembly from the ejector half contemporaneous with the parting and opening of the mold or subsequent to the parting and/or opening of the mold. In any case, the alternate embodiment liberates the completed lens assembly from the cover half prior to the parting and opening of the mold.

While the present invention has been described with respect to certain preferred and alternate embodiments, it is envisioned that certain modifications may be readily employed by those practicing ordinary skill in the art. Therefore, the described embodiments are intended to be taken by way of non-limiting example of the invention defined in the appended claims.

We claim:

1. A method of injection molding multi-color lens assemblies including respective viewing sides and illumination sides, comprising the steps:

(a) providing a multi-station injection molding apparatus having a plurality of non-indexing ejector halves corresponding to respective injection stations including ejector halves corresponding to an initial injection station and a final injection station and a corresponding plurality of indexing cover halves adapted for movement through sequentially progressive injection stations;

(b) valve gating station specific portions of the lens assemblies at respective injection stations from nozzle drops in the non-indexing ejector halves, said valve gating being performed at the illumination sides of the lens assemblies;

(c) simultaneously retaining the lens assemblies to the indexing cover halves with edge retention mechanisms engaging peripherally extreme portions of the lens assemblies while ejecting the lens assemblies from the non-indexing ejector halves as the indexing cover halves from the ejector halves are opened;

(d) releasing completed lens assemblies from the indexing cover half at the final injection station by disengaging corresponding edge retention mechanisms from the peripherally extreme portions of the corresponding lens assembly;

(e) shifting the indexing cover halves to respective sequentially progressive injection stations;

(f) fully closing the non-indexing ejector halves and indexing cover halves; and, (g) repeating steps (b) through (f).

2. A method of injection molding a multi-color lens assembly including a viewing side and an illumination side in a multi-station injection molding apparatus having a plurality of injection stations with respective nozzle drops including an initial injection station and a final injection station, the molding apparatus including a plurality of non-indexing halves corresponding to the plurality of injection stations and an indexing half adapted for movement through sequentially progressive injection stations, comprising the steps:

closing the indexing half to the non-indexing half corresponding to the initial injection station;

valve gating from the illumination side a first color transparent portion of the lens assembly including peripherally extreme features of the lens assembly that at least partially engage a plurality of interference mechanisms associated with the indexing half for obstructing release of the first color transparent portion of the lens assembly from the indexing half;

releasing the first color transparent portion of the lens assembly from the non-indexing half corresponding to the initial injection station by stroking a plurality of ejector pins located in the corresponding non-indexing half as the indexing half is parted from the corresponding non-indexing half;

moving the indexing half and first color transparent portion of the lens assembly to the next sequentially progressive injection station which is intermediate the initial and final injection stations and closing the indexing half to the corresponding non-indexing half;

valve gating from the illumination side a second color transparent portion of the lens assembly abutting the first color transparent portion of the lens assembly;

releasing the first and second color transparent portions of the lens assembly from the non-indexing half corresponding to the intermediate injection station by stroking a plurality of ejector pins located in the corresponding non-indexing half as the indexing half is parted from the corresponding non-indexing half;

moving the indexing half and first and second color transparent portions of the lens assembly to the final injection station and closing the indexing half to the non-indexing half corresponding to the final injection station;

valve gating from the illumination side a frame portion of the lens assembly abutting predetermined portions of the illumination side of at least one of the first and second color transparent portions to complete the multi-colored lens assembly; and, releasing the multi-colored lens assembly from the final injection station.

3. The method of injection molding a multi-color lens assembly according to claim 2 wherein the step of releasing the multi-colored lens assembly from the final injection station comprises the steps:

releasing the multi-colored lens assembly from the non-indexing half corresponding to the final injection station by stroking a plurality of ejector pins located in the corresponding non-indexing half as the indexing half is parted from the corresponding non-indexing half; and releasing the multi-colored lens assembly from the indexing half by disengaging the plurality of interference mechanisms from the peripherally extreme features of the lens assembly to thereby liberate the multi-colored lens assembly from the indexing half.

4. The method of injection molding a multi-color lens assembly according to claim 2 wherein the step of releasing the multi-colored lens assembly from the final injection station comprises the steps:

disengaging the plurality of interference mechanisms from the peripherally extreme features of the lens assembly to thereby liberate the multi-colored lens assembly from the indexing half;

parting the indexing half from the non-indexing half leaving the multi-colored lens assembly on the non-indexing half corresponding to the final injection station; and, releasing the multi-colored lens assembly from the non-indexing half corresponding to the final injection station by stroking a plurality of ejector pins located in the corresponding non-indexing half.

5. A multi-station injection molding apparatus for molding multi-color lens assemblies having a plurality of injection stations including initial and final injection stations, the injection stations having respective nozzle drops for molding material injection into molds comprising closed ejector and cover halves, the molding apparatus comprising:

non-indexing ejector halves associated with each injection station, each non-indexing ejector half including respective ejector pins and nozzle drops adapted for valve gating station specific portions of the lens assembly from an illumination side thereof;

an indexing cover half adapted for movement through sequentially progressive injection stations, said indexing cover half including edge retention heads which in an engaged position overlap peripherally extreme features of the lens assembly molded at the initial injection station to retain the lens assembly to the indexing cover half and in a disengaged position clear the peripherally extreme features of the lens assembly to liberate the lens assembly from the indexing cover half;

ejection apparatus associated with each non-indexing ejector half for stroking respective ejector pins subsequent to molding material injection at the corresponding injection station; and positioning apparatus for establishing the edge retention heads in the engaged position prior to molding material injection at the initial station and in the disengaged position subsequent to molding material injection at the final station.

6. A multi-station injection molding apparatus as claimed in claim 5 wherein the ejection apparatus associated with each non-indexing ejector half strokes respective ejector pins contemporaneously with parting of the indexing cover half from the corresponding non-indexing ejector half, and the positioning apparatus establishes the edge retention heads in the disengaged position subsequent to parting of the indexing cover half from the corresponding non-indexing ejector half at the final station.

7. A multi-station injection molding apparatus as claimed in claim 5 wherein the ejection apparatus associated with non-indexing ejector halves which are not associated with the final injection station strokes respective ejector pins contemporaneously with parting of the indexing cover half from the corresponding non-indexing ejector half, the positioning apparatus establishes the edge retention heads in the disengaged position prior to parting of the indexing cover half from the corresponding non-indexing ejector half at the final station, and the ejection apparatus associated with non-indexing ejector half which is associated with the final injection station strokes respective ejector pins subsequent to the parting of the indexing cover half from the corresponding non-indexing ejector half.

8. A multi-station injection molding apparatus as claimed in claim 5 wherein said edge retention heads are slidably engaged to the indexing cover half and the positioning apparatus comprise substantially fixed cam pins in the non-indexing ejector half associated with the initial injection station, the edge retention heads further defining cam pin receiving holes which receive respective cam pins upon closure of the indexing cover half to the non-indexing ejector half associated with the initial injection station.

9. A multi-station injection molding apparatus as claimed in claim 8 wherein said positioning apparatus further comprise replaceable lock block wear plates fixed in the non-indexing ejector half associated with the initial injection station for establishing a leak free interface between the edge retention heads and non-indexing ejector half associated with the initial injection station.

10. A multi-station injection molding apparatus as claimed in claim 5 wherein said edge retention heads are slidably engaged to the indexing cover half and the positioning apparatus comprise dowel pins fixably engaged to respective retractable slides in the non-indexing ejector half associated with the final injection station, the edge retention heads further defining dowel pin receiving holes which receive respective dowel pins upon closure of the indexing cover half to the non-indexing ejector half associated with the final injection station.

11. A multi-station injection molding apparatus as claimed in claim 5 wherein said positioning apparatus comprise lifter shafts attached at proximate ends to a cover lifter plate and attached at distal ends to the edge retention heads, said lifter shafts being slidably mounted through the indexing cover half, said edge retention heads being in the engaged positioned when the cover lifter plate is provided with a maximum spacing from said indexing cover half and said edge retention heads being in the disengaged positioned at less than the maximum spaced adjacency to the indexing cover half when the cover lifter plate is provided with less than the maximum spacing from said indexing cover half.

* * * * *